(12) United States Patent
Fresnel

(10) Patent No.: US 9,181,119 B2
(45) Date of Patent: Nov. 10, 2015

(54) ELECTROLYSIS METHOD, AND METHOD AND PLANT FOR THE PRETREATMENT OF RAW WATER

(75) Inventor: Jean-Marie Fresnel, Thoiry (FR)

(73) Assignee: F-TEC SYSTEMS S.A., Monthey (CH)

( * ) Notice: Subject to any disclaimer, the term of this patent is extended or adjusted under 35 U.S.C. 154(b) by 1097 days.

(21) Appl. No.: 13/203,997

(22) PCT Filed: Mar. 4, 2010

(86) PCT No.: PCT/CH2010/000056
§ 371 (c)(1),
(2), (4) Date: Nov. 10, 2011

(87) PCT Pub. No.: WO2010/102418
PCT Pub. Date: Sep. 16, 2010

(65) Prior Publication Data
US 2012/0055871 A1   Mar. 8, 2012

(30) Foreign Application Priority Data
Mar. 9, 2009 (EP) .................... 09356017

(51) Int. Cl.
*C02F 1/32* (2006.01)
*C02F 9/00* (2006.01)
*C02F 1/467* (2006.01)
*C02F 1/40* (2006.01)
*C02F 1/461* (2006.01)
*C02F 1/463* (2006.01)
*C02F 3/00* (2006.01)
*C02F 3/06* (2006.01)
*C02F 3/30* (2006.01)
*C02F 101/10* (2006.01)
*C02F 101/20* (2006.01)

(52) U.S. Cl.
CPC ................. *C02F 9/00* (2013.01); *C02F 1/4674* (2013.01); *C02F 1/40* (2013.01); *C02F 1/463* (2013.01); *C02F 1/46114* (2013.01); *C02F 3/005* (2013.01); *C02F 3/06* (2013.01); *C02F 3/302* (2013.01); *C02F 2001/46133* (2013.01); *C02F 2101/105* (2013.01); *C02F 2101/20* (2013.01); *Y02W 10/12* (2015.05); *Y02W 10/15* (2015.05)

(58) Field of Classification Search
CPC ...................................... C02F 1/32; C02F 1/34
USPC .............. 210/630, 748.2, 631, 150, 153, 243; 205/348; 204/155, 157.15, 193
See application file for complete search history.

(56) References Cited

U.S. PATENT DOCUMENTS

| | | | |
|---|---|---|---|
| 4,014,766 A * | 3/1977 | Watanabe et al. ............. | 205/746 |
| 5,578,200 A | 11/1996 | Funakoshi | |
| 2002/0070122 A1* | 6/2002 | Wu et al. ....................... | 205/560 |
| 2005/0167285 A1 | 8/2005 | Pushpavanam | |
| 2006/0000784 A1 | 1/2006 | Khudenko | |
| 2010/0051477 A1* | 3/2010 | Jeon et al. ..................... | 205/751 |

FOREIGN PATENT DOCUMENTS

| | | |
|---|---|---|
| EP | 0595178 | 10/1993 |
| FR | 7915915 | 6/1979 |
| FR | 2740129 | 10/1995 |
| JP | 51150866 | 12/1976 |
| JP | 60005890 A * | 1/1985 |
| JP | 05009799 A * | 1/1993 |

* cited by examiner

*Primary Examiner* — Walter D Griffin
*Assistant Examiner* — Cameron J Allen
(74) *Attorney, Agent, or Firm* — Sturm & Fix LLP

(57) ABSTRACT

The invention relates to an electrolysis method that uses iron particles and an aqueous solution containing sodium hypochlorite. The method is characterized in that said method uses direct current, the iron particles form the anode (46) and the sodium hypochlorite concentration of the aqueous solution is at least 1 g/L. The invention further relates to a method and to a plant for the pretreatment of raw water for producing water that can then be easily treated in order to produce drinkable water or a so-called technical water that cannot be consumed but that can be used for household, agricultural or industrial applications such as cleaning, washing, laundry, flushing, garden watering or irrigation.

8 Claims, 1 Drawing Sheet

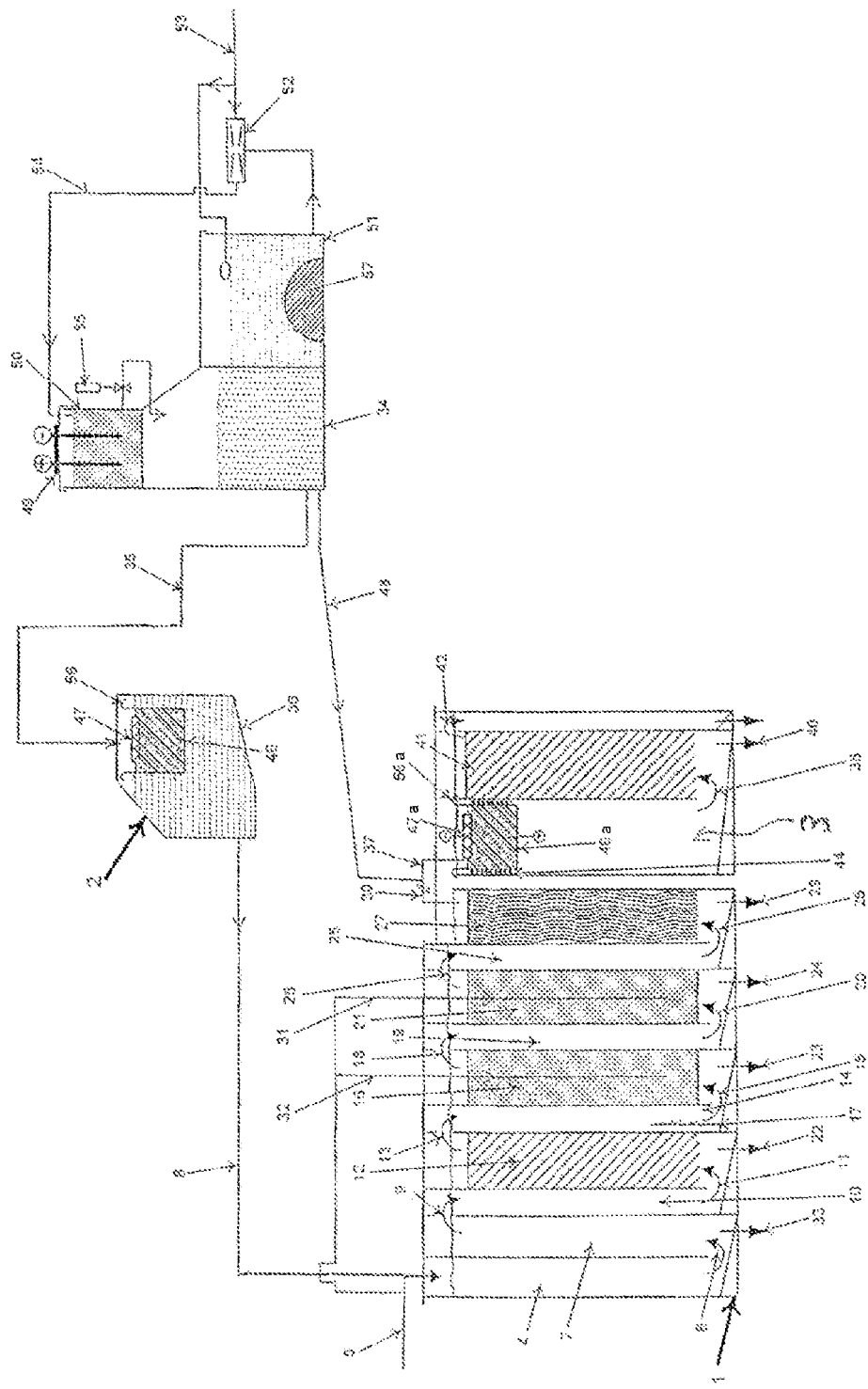

ELECTROLYSIS METHOD, AND METHOD AND PLANT FOR THE PRETREATMENT OF RAW WATER

The invention relates to an electrolysis process and also to a process and a plant for pretreating raw water that are intended to produce water which could then be easily treated to give drinking water or water known as "technical" water, i.e. water that is unfit for consumption but which may find domestic, agricultural and industrial uses, such as cleaning, washing, laundering, flushing toilets, watering a garden or irrigating.

BACKGROUND OF THE INVENTION

In European patent application EP 0 595 178 a device for electrolytic wastewater treatment having vertical electrodes is described. It is indicated in this document that the electrolysis uses a direct current, a soluble iron anode and a suspension or dust of "coke" particles (cf. page 3, column 4, lines 32 and 34) with a view to producing a galvanic coagulation.

U.S. Pat. No. 4,014,766 relates to a process for treating raw waters using a device having a vertical cathode and an anode containing iron turnings (column 3, line 5), so as to give rise to a flocculation of iron hydroxide. The floc is then oxidized.

In French patent application No. FR 2 459 067, a plant for the electro-purification of waters, is described in which electrocoagulation is produced by means of electrodes constituted of baskets containing scrap iron (page 5, lines 10, 11).

The United States patent published under the No. US 2005/0167285 relates to the removal of arsenates contained in drinking water. It mentions the formation of a metal hydroxide via anodic dissolution (page 3, paragraph [0046]) of an anode which may be made of mild steel or stainless steel (paragraph [0048]).

Document JP 51150866 discloses a process for disposing of wastewater containing $Cr^{6+}$ ions, in which these ions are electrolytically reduced to $Cr^{3+}$ ions in a device having a vertical cathode surrounding particles contained in a receptacle.

United States patent application No. US 2006/0000784 describes a process for treating wastewater in several steps. A first step may consist in obtaining an intermediate effluent, for example by coagulation or flocculation (page 2, left-hand column, line 2). In a second step, it is possible to treat the intermediate effluent by using (paragraph [0021]):
  either a spontaneous electrochemical treatment, in which sacrificial iron scrap that is activated, preferably by ferric ions, is used; these ferric ions may be formed by oxidation of metallic iron or of ferrous ions using, in particular, active chlorine;
  or an electrochemical treatment that takes place in a non-spontaneous manner, by applying electric tension to a sacrificial metal or to ferrous ions.

In U.S. Pat. No. 5,578,200, the coagulants customarily used are cited. These are, in general, inorganic coagulants such as aluminum sulfate, aluminum chloride and ferric chloride. The aforementioned United States patent application No. US 2006/0000784 also mentions (paragraph [0015]) the use of sacrificial metals which may be, besides iron and aluminum, nickel, cobalt, zinc, copper and combinations thereof.

More than ten years ago already, the inventor of the present patent application developed the process for pretreating raw waters that is the subject of the French patent application published under the number FR 2 740 129.

This process comprises a step of shock chlorination using hypochlorite then a step of thorough disinfection by electrolysis of iron particles which may be contained in titanium or zirconium baskets covered with a catalyst and stirred mechanically or ultrasonically.

During this thorough disinfection, the water to be treated is electrolyzed using an alternating current, with a view to reducing the residual active chlorine. The residual hypochlorite remaining in the water to be treated, the concentration of which is very low, of the order of 1 to 5 ppm, is also electrolyzed at the same time.

The inventor has continued its research with a view to improving its process and integrating the new standards regarding drinking water, in particular the European standard DWD 98/83/EC, and also the latest recommendations of the World Health Organization (WHO) in this field.

The inventor has thus succeeded in developing novel processes, devices and plants capable of pretreating waters of an even more degraded quality than before, having higher loadings of sludges, salts, nitrites, organic compounds and/or heavy metals.

SUMMARY OF THE INVENTION

The invention is based on the development of a novel coagulant which is obtained by electrolysis of an aqueous solution having a high concentration of concentrated sodium hypochlorite, in the presence of iron.

The exact nature of the coagulant obtained during this electrolysis is not known to date (studies are underway in order to determine it), it would appear that it is constituted of a dense suspension containing ferric ions and fine particles. Be that as it may, this coagulant has proved to be particularly active.

A main subject of the invention is therefore an electrolysis process according to point 1 below:
1. A process for the electrolysis of an aqueous solution, wherein:
   iron particles are introduced into a metallic receptacle contained in a tank equipped with an electrode not touching this metallic receptacle;
   an aqueous solution containing sodium hypochlorite is introduced into said tank so that it at least partially covers the iron particles and is in contact with the electrode;
   current is supplied to the metallic receptacle and the electrode;
   the product of the electrolysis is extracted from the tank; characterized in that
   the current is direct current;
   the metallic receptacle containing iron particles is the anode and the electrode is the cathode; and
   the sodium hypochlorite concentration of the aqueous solution is at least 1 g/l (1000 ppm).

Advantageous features of the electrolysis process from the aforementioned point 1 are indicated in points 2 to 4 below:
2. The electrolysis process according to point 1, wherein the sodium hypochlorite concentration of the aqueous solution is greater than 4 g/l and is in particular around 6.5 g/l.
3. The electrolysis process according to point 1 or 2, wherein the aqueous solution also contains sodium chloride.
4. The electrolysis process according to point 3, wherein the sodium chloride concentration is at least 10 g/l and preferably around 15 g/l.

The product obtained by this electrolysis process is therefore the contents of the tank. After extraction from the tank, it may be used as coagulant in a raw water treatment process.

Thus, the invention also relates to a process for pretreating raw water according to point 5 below:

5. A process for pretreating raw water, wherein the electrolysis product obtained by the implementation of the process according to one of points 1 to 4 is used as coagulant.

Advantageous features of the process for pretreating raw water from the aforementioned point 5 are indicated in points 6 to 9 below:

6. The process for pretreating raw water according to point 5, comprising:
   a step of introducing the coagulant into the raw water to be pretreated; then
   an aerobic then anaerobic biological filtration step.
7. The process for pretreating raw water according to point 6, comprising, in addition:
   a step of electrolysis of the water originating from the aerobic then anaerobic biological filtration step.
8. The process for pretreating raw water according to point 7, comprising, in addition:
   a step of introducing sodium hypochlorite into the water originating from the aerobic then anaerobic biological filtration step, before the electrolysis step.
9. The process for pretreating raw water according to one of points 5 to 8, comprising, in addition:
   a step of producing an aqueous solution of sodium hypochlorite.

Another subject of the invention is a plant for pretreating raw water, comprising an electrolysis device capable of implementing the electrolysis process according to the invention, the central features of which are stated in point 10 below:

10. A plant for pretreating raw water, comprising:
    an electrolysis device comprising a tank containing a metallic receptacle and an electrode not touching this metallic receptacle;
    the outlet of this electrolysis device being located above a flow straightener or connected to the feed pipe of the raw water to be treated, upstream of a biological filter comprising an aerobic filter bed followed by an anaerobic filter bed.

Advantageous features of the process of the plant for pretreating raw water from the aforementioned point 10 appear in points 11 to 18 below:

11. The plant according to point 10, wherein the cathode is positioned horizontally above or inside the metallic receptacle, in its upper part.
12. The plant according to point 10 or 11, wherein the cathode is in the form of a grid.
13. The plant according to one of points 10 to 12, comprising, in addition, stirring means for the metallic receptacle.
14. The plant according to one of points 10 to 13, comprising, in addition:
    a second electrolysis device comprising a tank containing a second metallic receptacle and a second electrode;
    the inlet of this second electrolysis device being connected to the outlet of the biological filter.
15. The plant according to point 14, wherein the second electrode is positioned horizontally above or inside the second metallic receptacle, in its upper part.
16. The plant according to point 14 or 15, wherein the second electrolysis device is equipped with an electromagnet or induction loop surrounding the second metallic receptacle.
17. The plant according to points 10 to 16, comprising, in addition, a device for producing an aqueous solution of sodium hypochlorite, the outlet of which is connected to the inlet pipe of the first electrolysis device.
18. The plant according to point 17, when this refers to point 14, 15 or 16, wherein a pipe connects the device for producing an aqueous solution of sodium hypochlorite to the inlet of the second electrolysis device.

The plant for pretreating raw water according to points 17 and 18 has the huge practical advantage of requiring, for its operation, only raw materials that are easy to find:
   salt (sodium chloride) for producing sodium hypochlorite;
   iron particles for producing the coagulant;
   and electricity for carrying out the electrolyses (and optionally powering pumps, the electromagnet, solenoid valves, the air compressor and the control and regulation system);
   the water used for producing the solution of sodium hypochlorite possibly being taken from the water pretreated by the plant.

The pretreated water obtained may then undergo additional treatments, with a view, in particular, to increasing its purity.

Such processes and plant for pretreating raw water have the major advantage of making it possible to treat waters originating from very varied sources.

Other features and advantages of the invention will now be described in detail in the account which follows and which is given with reference to the appended FIGURE which schematically represents a preferred embodiment of a plant for pretreating raw water.

DETAILED ACCOUNT OF THE INVENTION

Represented in the only appended FIGURE is a plant for pretreating raw water according to the invention capable of implementing the electrolysis process according to the invention. This plant is essentially composed of three main elements which are:
   a filtration device 1 into which the raw water arrives;
   a first electrolysis device 2 used for producing a coagulant for the filtration device 1; and
   a second electrolysis device 3 used for treating the water originating from the filtration device, after an aqueous solution of sodium hypochlorite has been added thereto.

a) Filtration Device

The filtration device described in the FIGURE comprises a compartment 4 acting as a flow straightener for the raw water. Thus, the velocity of the stream of raw water arriving at the top of compartment 4 via the pipe 5 is decreased, its eddies are reduced.

Furthermore, a coagulant introduced via the outlet pipe 8 of the first electrolysis device 2 (described in detail below) is poured into the upper part of the compartment 4 or introduced into the pipe 5 and is added to or mixes with the raw water.

Thus, inside compartment 4, the largest particles of the raw water and also the finest particles which coalesce or coagulate and flocculate owing to the action of the coagulant fall to the bottom of compartment 4.

An opening 6 made in the bottom of a wall of the compartment 4 allows the water to enter into an adjacent compartment 7 that acts as a coalescer.

An inclined plane crossing compartments 4 and 7 enables the large or coagulated particles originating from compartments 4 and 7 to be discharged by the discharge pipe 33.

An opening 9 made close to the top of compartment 7 enables the water to penetrate into an adjacent intermediate compartment 10, in the lower part of one wall of which an opening 11 is made that constitutes the inlet to a lamellar settling tank 12 preferably having lamellae oriented at 40 degrees.

Particles, essentially compounds of phosphate type, precipitate at the bottom of compartment 10, the coagulated sludges at the bottom of the lamellar settling tank 12 and, owing to an inclined plane crossing the bottom of compartment 10 and of the lamellar settling tank, these particles and coagulated sludges are discharged via a pipe 22.

The outlet of the settling tank 12 is constituted of an opening 13 located above the lamellae of this settling tank 12, at the top of one of its walls. The supernatant clear liquid is introduced via the opening 13 into an adjacent intermediate compartment 14 which is supplied with air via a pipe 17, so that the water is saturated with air and so that the oxidizable elements in solution or in suspension oxidize. Thus, for example, the residual ferrous ions present in trace amounts oxidize to ferric ions.

The intermediate compartment 14 comprises a wall, the lower part of which is provided with an opening 15 constituting the inlet to a biological filter.

This biological filter is composed of a first aerobic filtration compartment 16 comprising a bed of hydrophobic and oleophilic fibers made of polypropylene. This bed of fibers is highly aerated by free air or air in solution transported by the water arriving from compartment 14 and enriched with compressed air injected by means of the air feed pipe 17. As a variant, it is also possible to inject oxygen or a mixture of suitable gases containing oxygen.

A nitrification thus takes place. The particles falling to the bottom of the intermediate compartment 14 or of the first compartment 16 are, owing to an inclined plane crossing the intermediate compartment 14 and the compartment 16, removed via a pipe 23.

The water rising back up inside the first compartment 16 of the biological filter comes to an opening 18 made at the top of one wall of this compartment 16 with a view to passing into an adjacent intermediate compartment 19 having a wall, the lower part of which is provided with an opening 20 constituting the inlet to the second compartment of the biological filter 21. The water rises back up into this second compartment 21 in which a second bed of hydrophobic and oleophilic fibers also made of polypropylene is found. However, unlike the first bed of fibers, this second bed is not aerated. It is without an air feed pipe such as the pipe 17 and an anaerobic filtration therefore takes place which, by denitrification, degrades the nitrogen-containing and organic matter contained in the water.

The particles falling to the bottom of the adjacent intermediate compartment 19 or of the second anaerobic filtration compartment 21 are, owing to an inclined plane crossing these compartments, removed via a pipe 24.

Mechanical stirring means (not shown), for example cylinders, are preferably provided in order to stir the filter beds and detach the biomass formed.

Advantageously, each of the biological filtration compartments 16, 21 is provided with a supply line 31, 32. These lines 31, 32 are connected to the raw water feed pipe 5 and they thus enable initial raw water to be introduced dropwise. This small amount of raw water introduced supplies bacteria which attach themselves to the fibers of the filter beds. A bacterial inoculation is thus produced. As a variant, it is possible to provide an opening or a device that makes it possible to introduce, into the biological filtration compartments 16, 21 or into the lines 31, 32, bacteria in the form of an aqueous bacterial preparation or in the form of gel capsules or powder, advantageously in metered form.

Depending on the conditions prevailing in the medium, the bacteria that colonize each of the two compartments of the biological filter specialize. Depending on the case, they enable nitrification or denitrification and they decompose the oils and fats trapped by the fibers and thus clean the latter.

Similarly, aqueous ammonia is nitrified then decomposed to nitrogen in the absence of oxygen.

An outlet 28 provided at the top of a wall of the compartment 21 enables the biomass-loaded water to reach an adjacent intermediate compartment 25, the lower part of which is provided with an opening 26 constituting the inlet to the separator 27. This separator 27 is formed of porous curtains made of polypropylene. The water crosses this separator 27 from bottom to top, then, once it has arrived at the top, is discharged via a pipe 30 to the second electrolysis device 3.

The particles falling to the bottom of the intermediate compartment 25 or of the separator 27, owing to an inclined plane crossing the latter, are removed via a pipe 29.

b) Electrolysis Device 2

As indicated above, the role of this device is to produce the coagulant which will then be introduced, by means of the outlet pipe 8, into the flow straightener 4 then into the coalescer 7 which communicates, on one side, with the outlet of the flow straightener 4 and, on the other side, with the lamellar settling tank 12.

Normally, this device 2 comprises a tank containing:
an aqueous solution of sodium hypochlorite;
an anode comprising a metallic receptacle, such as a basket 46 containing iron beads submerged in the aqueous solution of sodium hypochlorite; and
a cathode having at least one submerged part, generally in the form of a grid 47, in the aqueous solution of sodium hypochlorite, this submerged part being above the iron beads.

The cathode 47 is preferably positioned horizontally above or inside the metallic container, in its upper part.

The sodium hypochlorite generally originates from a reservoir of aqueous solution of sodium hypochlorite 34 and is generally poured, by means of an inlet pipe 35 of the electrolysis device 2, over the cathode 47.

One advantageous variant consists in directly supplying the reservoir 34 with sodium hypochlorite produced on site by means of a supplementary device constituted of an electrolyzer 49 that is immersed in an electrolytic cell 50 filled with a solution of sodium chloride, the concentration of which is between 20 and 26 g/l and is more advantageously around 22 g/l. This saline solution is obtained by mixing a salt-saturated brine 57, contained in a tank 51, with softened drinking water arriving via a pipe 53, through an eductor 52. By means of this eductor 52, the concentrated brine is sucked up and mixed with the softened drinking water in order to obtain a saline solution containing 22 g/l of salt which is poured into the electrolytic cell 50 via the pipe 54. The electrolyzer 49 is supplied with direct current until a sodium hypochlorite solution containing 6.5 g/l of chlorine equivalent is obtained. When the level of hypochlorite solution in the reservoir 34 is low enough, following the consumption thereof, the valve 55 opens in order to drain the electrolytic cell 50 and fill the reservoir 34.

Furthermore, the use of such a supplementary production device has the advantage of providing an aqueous solution that contains both sodium hypochlorite at high concentration and sodium chloride. Owing to the increase in the conductivity due to the presence of sodium chloride, the electrolysis voltage in the electrolysis device 2 may remain low, generally below 10 volts.

To prevent it being chemically attacked by the solution originating from the tank 34, the metallic receptacle or basket containing the iron beads is generally at least partially made of titanium or of a titanium alloy, for example made of titanium/silver having 2 to 5% silver, made of titanium/palladium or made of titanium/precious metal oxides. It may also be made of zirconium or of a zirconium alloy.

The basket is generally suspended by handles 56 that hook over two walls of the tank of the electrolysis device. It generally has a circular or rectangular cross section. It may be formed from a metallic grid or from a metallic foil comprising small enough perforations so that the beads do not pass through them. These perforations enable the circulation of the aqueous solution.

Instead of iron beads, it is also possible to use iron shot or turnings.

It was surprisingly noted that it is not necessary to provide the face of the cathode grid 47 facing the beads with the conventional separating element which is generally a food-grade porous textile, which may be for example a geotextile made of glass cloth of small thickness or a textile made of polyethylene or of polypropylene, woven or non-woven and which is often resistant to tearing. Indeed, despite the absence of the separating element, no short-circuiting occurs.

The cathode grid 47 may be made of titanium, made of a titanium alloy, made of a Hastelloy® alloy or made of any other metal or alloy that is resistant to corrosion by ferric ions in a chloride and hypochlorite medium.

Given that the cathode 47 is located above the iron particles and that the outlet pipe 8 leaves from the bottom 36 of the tank, the circulation of the product of the electrolysis takes place from the top to the bottom, the effect of which is that there is no substantial return backwards (towards the top) of the ferrous and ferric ions and therefore no reduction of the latter. This effect is reinforced by the fact that the electrolysis takes place under a direct current.

Furthermore, such a configuration has the advantage of enabling a better distribution of the streamlines, which improves its operation. Furthermore, the device does not need to comprise more than one metallic receptacle, which renders it simple to produce.

Preferably, the bottom 36 of the tank is inclined towards the outlet pipe 8.

The device 2 is preferably equipped with means (not shown) for stirring the metallic receptacle which may be a pneumatic or electric vibrator or cylinder, or a magnetic or ultrasonic vibrator.

Operation of the Electrolysis Device 2

Although the electrolysis device 2 may operate discontinuously in batch mode, it is preferably used continuously.

It goes without saying that the iron particles are introduced into the perforated basket at the start then iron particles are added after a certain operating time. Typically, the beads are replenished every two weeks so that these beads do not run out in the basket.

Similarly, during the startup of the plant, it is necessary to wait for the electrolysis to take place for several minutes/hours, the tank being sized so that the preparation lasts from 3 to 5 hours, before extracting the coagulant from the tank.

An aqueous solution of sodium hypochlorite (NaClO) is introduced into the tank by means of the pipe 35.

The anode and the cathode are supplied with direct current. The intensity of this current may be variable. It may also be in the form of pulses. Its voltage is low, generally less than 10 V, for example from 0.5 V to 1 V.

Inside the basket, owing to the presence of the sodium hypochlorite, at ambient temperature and at a pH close to neutrality, an electrochemical dissolution of the iron and various reactions take place, during which the ferrous ion ($Fe^{2+}$) is oxidized to ferric ion ($Fe^{3+}$). It appears to form ferric chloride ($FeCl_3.6H_2O$), and also apparently, in a smaller amount, another insoluble microcrystalline compound probably formed of microcrystals of iron oxide-hydroxide. A suspension is thus obtained in the tank, which is believed to contain ferric chloride, iron hydroxides and iron oxide-hydroxide.

Stirring means are provided to stir the anode. It is not necessary for them to stir the cathode. By agitating the anode, they prevent the formation, on the beads, of a coating which would stop or slow down the electrolysis.

The product of the electrolysis or reaction mixture contained in the tank is discharged via the outlet pipe 8 in order to be used as coagulant in the flow straightener 4 followed by the coalescer 7. This coagulant is intended to give rise to the densification of the materials in suspension in the water to be treated, such as the sludges, and the precipitation of phosphates. The precipitates carry along, by reaction and absorption, other compounds such as for example heavy metals including lead and arsenic, but also nitrates and organic compounds; regarding the cyanides, they are immediately neutralized.

Preferably, the electrolysis device 2 is placed high up, that is to say above the flow straightener. Thus, only the pressure of the height of liquid in the tank is sufficient to circulate this liquid. In the case where this is not possible, a metering pump is used to inject the coagulant into the flow straightener 4.

The amount of coagulant injected into the flow straightener 4 is determined as a function of the raw water to be treated. By way of example, for 1 $m^3$/h of raw water containing from 5 to 50 mg/l of suspended matter (SM), the flow rate of coagulant injected is from 130 $cm^3$/h to 850 $cm^3$/h, for a water containing 50 to 150 mg/l of SM, the flow rate of coagulant is from 850 to 1350 $cm^3$/h and for a water containing 150 to 1500 mg/l of SM, the flow rate of coagulant is 1350 to 2680 $cm^3$/h.

c) Electrolysis Device 3

The electrolysis device 3 comprises elements similar to those of the electrolysis device 2: a perforated basket 47a having handles 56a, a cathode 47a positioned preferably horizontally and which may be a grid above which a pipe 37 opens.

However, the dimensions of the electrolysis device 3 are normally substantially larger, since it is intended to treat all the water circulating through the plant.

In this device, the sodium hypochlorite concentration of the aqueous solution is lower than in the electrolysis device 2, of the order of 1 to 5 mg/l (ppm) for the device 3 instead of, typically, 6500 ppm for the device 2 and the total content of sodium chloride in the device 3 is very low, of the order of 15 to 25 mg/l.

It follows therefrom that the conductivity of the liquid is lower. Consequently, the distance between the cathode 47a and the bed of beads must be short. It corresponds, in general, to the thickness of the porous separating element, i.e. around 0.7 mm. Here there is generally a porous cloth for the separation, the cathode grid is covered with this cloth and thus rests on the bed of iron particles.

This device is also provided with an electromagnet constituted of a solenoid coil 44 surrounding the basket 46a having handles 56a and containing the beads. An alternating current runs through the coil and develops a magnetic field, the induction of which is greater than 0.01 Tesla.

Preferably, the inside of the basket is preferably at least partially covered with a layer of catalyst, generally palladium.

Similarly, the cathode 47a is itself also preferably at least partially covered with a layer of catalyst, generally palladium, in particular on the side facing the beads.

The dimensions of the electrolysis device 3 are in general different from those of the electrolysis device 2, since its role is completely different.

Indeed, the electrolysis device 3 fulfils in particular the following roles:
  it reduces the excess hypochlorite remaining in the water,
  it extracts the heavy metals and the toxic elements such as arsenic,
  it changes the crystallographic nature of the calcium carbonate contained in the water, and
  it destroys the organohalogenated compounds, in particular chloraminated compounds, contained in the water.

Thus, it imparts or reimparts to the water the qualities of a spring water.

This device has the advantage of making it possible to treat waters containing heavy metals and/or toxic elements such as arsenic and/or organic compounds, waters having a calcium hardness of greater than 15° F. (that is to say, the calcium carbonate concentration of which is greater than 150 mg/l) and stagnant waters originating, for example, from poorly aerated lagoons or from reservoirs where the waters have stayed for too long.

Operation of the Electrolysis Device 3

Referring again to the appended FIGURE, it is seen that the water exiting via the outlet pipe 30 from the separator 27 of the filtration device 1 has the solution of sodium hypochlorite originating from the tank 34 via the pipe 48 added to it, before being introduced into the second electrolysis device 3 via the inlet pipe 37 of the latter.

One advantageous variant consists, here too, in using the supplementary device already mentioned as a source of sodium hypochlorite for the tank 34. The first role of the sodium hypochlorite is to disinfect the water arriving via the outlet pipe 30. The pH of the sodium hypochlorite solution produced by the supplementary device is close to 7. This solution has the advantage of containing hypochlorous acid, a more active disinfectant than sodium hypochlorite with respect to germs.

Inside the tank of the electrolysis device 3, a direct current is circulated through the anode 46a and the cathode 47a. Thus, the iron of the beads oxidizes to ferrous cation, then to ferric cation at the anode.

The whole thing corresponds to the following overall reaction:

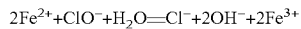

$$2Fe^{2+}+ClO^-+H_2O=Cl^-+2OH^-+2Fe^{3+}$$

The simultaneous presence of iron and of ferrous ions enables the $Fe/Fe^{2+}$ reducing pair to act on certain heavy metal ions. Furthermore, the ferric chloride oxidizes certain other ions and the ferric hydroxide present absorbs the not very soluble species formed both by reduction and by oxidation. Then these precipitate and may be removed via the pipe 40 provided at the bottom of the device. Thus, heavy metals present that have not completely disappeared during the preceding coagulation and biological filtration steps, such as cadmium, chromium or mercury, see their concentrations reduce considerably.

Means (not shown) for stirring the beads are provided. They give rise to the rubbing of the beads against one another which thus removes from their surfaces the oxide layer and the deposits which are formed thereon. This oxide and these deposits are then also removed via the pipe 40.

As stirring means, use has preferably been made of an electromagnet, preferably supplied with an alternating current so as to generate a variable magnetic field. The electromagnet has the advantage of not comprising moving parts which could wear away and of avoiding the use of seals, and of movable electrical contacts. Furthermore, the stirring effect penetrates within the bulk of beads since it is not limited to a surface layer.

The potential difference between the anode and the cathode is preferably from 0.5 to 1.5 V.

Preferably, the direct current is intermittent, that is to say cut regularly or in accordance with a pulse train, with a frequency ranging from 0.1 to 5 Hz, preferably from 0.5 to 1 Hz. This has two effects: during the periods of absence of current, on the one hand, the electrodes depolarize and, consequently, the ions diffuse more freely and, on the other hand, the hypochlorite which crosses the cathode is not reduced by the cathode 47a and can therefore be reduced by oxidizing the ferrous ions to ferric ions.

The intensity of the current is a function of the flow rate of water passing through the electrolysis device 3. For example, with a flow rate of 4.550 m³/h, the intensity of the current is around 14 A.

The water present at the bottom of the device is introduced, via an opening 38 made in the bottom of one wall of the device, into the lower part of an adjacent lamellar settling tank 41. The particles falling to the bottom of this settling tank are removed via a discharge pipe 40 and the supernatant water is introduced via an outlet 42 into other devices in order to undergo various known subsequent treatments, in particular for further increasing its purity.

The palladium coating of the basket has the effect of decomposing the organic compounds such as the organohalogenated compounds, in particular the organochlorinated compounds such as the chloraminated compounds, and a portion of the residual nitrates. Moreover, the palladium amplifies the reduction phenomenon of the hypochlorite ions ($ClO^-$) and of the hypochlorous acid (HClO) by the ferrous ions.

The electromagnet also creates a magnetic field which modifies the structure of the calcium carbonate, the calcium ions orient themselves differently, which will subsequently promote the formation of crystals of not very adherent aragonite rather than of encrusting calcite and will limit the blockage of the pores of the filtration membranes when the water will subsequently undergo membrane filtration.

Furthermore, the magnetic field reorganizes the atoms in the molecule of water and thus reimparts to it its original properties.

The electromagnet is supplied with an alternating current, for example of 50 Hz.

Overall Operation of the Plant According to the Invention

The following data are provided by way of example for the treatment of around 5000 l/h of raw water having an SM content ranging from 5 to 1500 mg/l.

The concentration of the aqueous solution of sodium hypochlorite introduced into the first electrolysis device 2 is generally of the order of 6.5 g/l and its flow rate is generally from 3 to 15 l/h.

The flow rate of coagulant injected upstream of the biological filtration is generally between 0.5 and 15 l/h.

The surface area of the basket of the first electrolysis device 2, which may have a circular or rectangular cross section, is generally from 5 to 50 dm². Its height is generally from 30 to 100 mm.

The intensity of the direct current for the electrolysis of the first electrolysis device 2 is generally from 40 to 120 amperes.

The pretreated water obtained exiting via the pipe 42 from the second electrolysis device 3 already has a purity known as "technical" purity, that is to say that it must be subjected to supplementary treatments in order to be drinkable.

In certain cases, depending on the composition of the initial raw water, the pretreated water exiting via the outlet 42 from the second electrolysis device 3 may be drinkable or need only a limited supplementary treatment in order to be drinkable.

These subsequent treatments may be, for example, a filtration through a sand filter and/or through a microfiltration cartridge.

A filtration through activated charcoal may also be provided in order to eliminate odors, unpleasant tastes and colors from the water and also traces of residual hypochlorite. The pesticides and organic compounds (phenols, aromatic hydrocarbons, etc.) optionally still present in the water are thus eliminated for the most part.

If the purified water has too low a pH (less than 6.5), given that neither the filtration device 1 nor the auxiliary devices 2 and 3 have a significant effect on the pH, an addition of milk of lime (aqueous solution of calcium hydroxide) may be provided, upstream of the coalescer 7, for example in the compartment 4.

If, on the other hand, the pH of the purified water is too high (greater than 8.5), it is possible to insert upstream of the coalescer 7, a unit for neutralization using sulfuric acid.

It is also possible to provide an ultrafiltration in order to trap all the particles having a size greater than 0.01 µm (bacteria and viruses resistant to sodium hypochlorite included), which makes it possible to obtain a bacteriologically pure water, to extract the large organic molecules, to drastically reduce the amount of residual SM and to obtain a clear water, that is to say water having a practically zero turbidity.

A nanofiltration or reverse osmosis may also be envisaged, in particular when the species in solution cannot be trapped by ultrafiltration.

Of course, the plant according to the invention is provided with a supplementary means well known to a person skilled in the art, such as chlorine detectors, pH probes connected to pH meters, thermometers or thermocouples, flow meters, devices for measuring the conductivity, pumps, electrical or pneumatic valves, water or air meters, means for regulating or running these pumps, an air compressor, electronic and/or computer means for monitoring and/or controlling the operation of the devices, calculating various parameters or recording the results, etc.

EXAMPLE

This example demonstrates the effectiveness of the coagulant produced by the process according to the invention.

A raw water originating from a canal is treated in a plant in accordance with the appended FIGURE. The flow rate of raw water at the inlet is 4550 l/h, its turbidity at the inlet is high, 65 TU/F90°.

The coagulant produced on site by the first electrolysis device 2 is injected at the start of treatment at a flow rate of 600 cm$^3$/h.

The following results are obtained:

| Species present in or introduced into the raw water | Amounts contained in the water at the inlet (taken from the pipe 5) | Amounts contained in the water after injection of the coagulant and sedimentation (taken from compartment 14) | Amounts contained after coagulation, sedimentation and passage through the biological filter (taken from compartment 25) |
|---|---|---|---|
| Mesophilic aerobic germs/ml | 250 | 220 | 95 |
| Escherichia Coli U/100 ml | 51 | 50 | 00 |
| Enterococcus U/100 ml | 180 | 160 | 02 |
| Arsenic µg/l | 50 | <0.01 | <0.01 |
| Lead µg/l | 110 | <0.01 | <0.01 |
| Chromium µg/l | 200 | 132 | 95 |
| Cadmium µg/l | 20 | 13 | <2 |
| Nitrate $NO_3^-$ mg/l | 60 | 29 | 3.4 |
| Phosphate P mg/l | 3.10 | 0.45 | 0.40 |
| Cyanide $CN^-$ µg/l | 60 | <10 | <10 |

It is observed, on the one hand, that the coagulant is very effective on the metals, in particular arsenic and lead (cf. results from the 3$^{rd}$ column).

On the other hand, there is an excellent complementarity between the use of the coagulant according to the invention and the filtration device (cf. results from the 4$^{th}$ column).

It may even be deduced from this table that a synergistic effect occurs due to the combined use of a coagulant according to the invention and of an aerobic and anaerobic biological filtration.

The invention claimed is:

1. A process for the electrolysis of an aqueous solution, wherein:
   iron particles are introduced into a metallic receptacle (46) contained in a tank equipped with an electrode (47) not touching this metallic receptacle (46);
   an aqueous solution is introduced into said tank so that it at least partially covers the iron particles and is in contact with the electrode (47);
   direct current is supplied to the metallic receptacle (46) and the electrode (47), the metallic receptacle (46) containing iron particles being the anode and the electrode (47) being the cathode;
   characterized in that
   the aqueous solution introduced into the tank is an aqueous solution of sodium hypochlorite, the concentration of which is at least 1 g/l.

2. The electrolysis process as claimed in claim 1, wherein the sodium hypochlorite concentration of the aqueous solution is greater than 4 g/l.

3. The electrolysis process as claimed in claim 2, wherein the sodium hypochlorite concentration of the aqueous solution is 6.5 g/l.

4. A process for pretreating raw water, wherein:
   iron particles are introduced into a metallic receptacle (46) contained in a tank equipped with an electrode (47) not touching this metallic receptacle (46);
   an aqueous solution is introduced into said tank so that it at least partially covers the iron particles and is in contact with the electrode (47);
   direct current is supplied to the metallic receptacle (46) and the electrode (47), the metallic receptacle (46) containing iron particles being the anode and the electrode (47) being the cathode;

characterized in that
the aqueous solution introduced into the tank is an aqueous solution of sodium hypochlorite, the concentration of which is at least 1 g/l and in that the product of the electrolysis is extracted from the tank and introduced into the raw water to be pretreated.

5. The process for pretreating raw water as claimed in claim 4, wherein the raw water to be pretreated, into which the product of the electrolysis has been introduced, is subjected to an aerobic then anaerobic biological filtration.

6. The process for pretreating raw water as claimed in claim 5, wherein:
an aqueous solution of sodium hypochlorite is added to the water resulting from the biological filtration in an amount such that the sodium hypochlorite concentration is lower than in the tank containing the metallic receptacle (46);
then all the water is subjected to a second electrolysis.

7. The process for pretreating raw water as claimed in claim 6, wherein the amount of aqueous hypochlorite solution added is such that the sodium hypochlorite concentration of the aqueous solution subjected to the second electrolysis is of the order of 1 to 5 mg/l.

8. The process for pretreating raw water as claimed in claim 5, comprising, in addition:
a step of producing an aqueous solution of sodium hypochlorite, a portion of which is sent to the tank containing the metallic receptacle (46) and the other portion to the water resulting from the biological filtration, upstream of the second electrolysis.

\* \* \* \* \*